US005578746A

United States Patent [19]

Campbell

[11] Patent Number: 5,578,746
[45] Date of Patent: Nov. 26, 1996

[54] APPARATUS FOR CHEMICAL VAPOR DEPOSITION AND METHOD OF USE

[75] Inventor: Andrew C. Campbell, Austin, Tex.

[73] Assignee: Motorola, Inc., Schaumburg, Ill.

[21] Appl. No.: 496,636

[22] Filed: Jun. 28, 1995

[51] Int. Cl.⁶ ................................................. G01N 37/00
[52] U.S. Cl. .......................... 73/28.01; 73/28.04
[58] Field of Search ........................... 73/28.01, 28.04, 73/29.01

[56] References Cited

U.S. PATENT DOCUMENTS

| | | | |
|---|---|---|---|
| 4,485,665 | 12/1984 | Norman | 73/29.01 |
| 4,576,036 | 3/1986 | Huang et al. | 73/29.01 |
| 4,783,343 | 11/1988 | Sato | 427/8 |
| 4,852,389 | 8/1989 | Mayer et al. | 73/38 |
| 4,911,101 | 3/1990 | Ballingall, III et al. | 118/715 |
| 5,027,642 | 7/1991 | Wen et al. | 73/28.01 X |
| 5,271,264 | 12/1993 | Chanayem | 73/28.01 |

*Primary Examiner*—Hezron E. Williams
*Assistant Examiner*—Daniel S. Larkin
*Attorney, Agent, or Firm*—George R. Meyer

[57] ABSTRACT

Fluctuations may occur in the vapor flux of a chemical being delivered in an otherwise inert gas stream from various causes. For example, the decrease in vapor flux over time may occur due to unintended condensation, instability in the delivery system and for other reasons. It has been discovered that a vapor flux monitor may be used in any system involved in the delivery of a vapor flux of a particular chemical reagent. The apparatus has a small aperture or hole through which a gas sample is introduced under low pressure. The sample undergoes a sudden, rapid pressure drop causing condensation of the reagent vapor into droplets where a relative flux can be determined by a measuring device, such as an in situ particle monitor (ISPM). This information can then be used to adjust the flow rate of the reagent. The vapor flux monitor can be adjusted to remove and analyze specific chemical reagents, and samples may be taken at any suitable point from the system. Further, the vapor flux monitor has particular application for systems using high flow rates of reagents, e.g. low pressure chemical vapor deposition (LPCVD) reactors, and reagents with low volatility, particularly organo-metallic compounds such as metal β-diketonates.

26 Claims, 2 Drawing Sheets

APPARATUS FOR CHEMICAL VAPOR DEPOSITION AND METHOD OF USE

FIELD OF THE INVENTION

The invention relates to methods and apparatus for measuring the flow of a chemical species in a conduit, and more particularly relates, in one embodiment, to measuring the flow rate of one chemical species entrained in a carrier gas within a conduit.

BACKGROUND OF THE INVENTION

Chemical vapor deposition processes for ceramic or metallic materials on a semiconductor wafer require particular chemical species to be deposited on the surface of the wafer. The chemical species are carried along with or entrained in a carrier gas. In accomplishing the task of measuring the flow rate of a certain species, for example a relatively low volatility reactive chemical species entrained in a relatively high volatility carrier gas in a conduit for a manufacturing or other process, one might ideally use the equation:

$$\frac{P_R}{P_C} = \frac{F_R}{F_C}$$

where $P_R$ and $P_C$ are the partial pressures of the reactant gas and carrier gas respectively, and $F_R$ and $F_C$ are the flow rates of the reactant gas and carrier gas, respectively. However, in actual practice, it has been noted that an undesirable decrease in the count of desired species often occurs over time especially where the reactive chemical is an organo-metallic species of relatively low volatility. One speculates that the decreased flow of the reactant species may be due to unintended condensation, instabilities in the delivery system, or other causes.

Prior art methods for controlling the flow rate of the reactant species measure the pressure in the delivery line of the combined delivery and reactant gas, and then cause the carrier gas flow to increase if the measured pressure in the delivery line drops. However, chemical vapor deposition (CVD) systems have relatively higher flow rates of reagents as compared to other layer formation processes. Thus, relatively higher pumping speeds are presented to the delivery system, such as a bubbler, as compared with other deposition systems. Additionally, CVD systems have reactant species that are relatively less volatile, e.g. organo-metallic compounds, and have steeper vapor pressure curves than prior art systems which use simple pressure monitoring feedback loops.

Thus, it would be desirable if a suitable monitoring apparatus and method could be devised for these latter processes.

BRIEF DESCRIPTION OF THE DRAWINGS

The present invention is illustrated by way of example and not limited in the accompanying figures, in which like reference numerals indicate similar elements, and in which.

It will be appreciated that the drawings are not to scale, that all of the features are only schematically illustrated, that certain features are exaggerated in relative size to show detail, and that there may be other embodiments of the present invention which are not specifically illustrated.

DETAILED DESCRIPTION OF A PREFERRED EMBODIMENT

As noted, it has been discovered that when a bubbler delivery system is used to deliver reactive chemical species, the flow of reagent to a semiconductor surface declines over time. Particularly with respect to CVD processes, the solid or liquid reagent typically must be volatilized and kept at temperatures of 120° C. or higher. For purposes of this description, low volatility materials are defined to have a lower vapor pressure than water ($H_2O$) vapor at an equivalent temperature. In order to obtain adequate vapor pressure for typical CVD use, these materials are typically held at temperatures above room temperature, but below 320° C., necessitating the use of a heater around the bubbler container. In any event, the volatility of the chemical reagent is lower than that of the carrier gas. With low volatility materials, their vapor pressure is much more sensitive to temperature, thus the reagent delivery stability becomes more susceptible to temperature variations. This is particularly true of organo-metallic species, such as metal β-diketonates and the like. While this decline may be due to instabilities in the bubbler or other mechanisms used to volatilize the reactant gas, a new monitor for more accurately measuring the vapor flux of the reagent chemical has been discovered. The vapor flux monitor of this invention samples the reagent gas at some point in a system and passes it through an aperture to a region of lower pressure which effects a sudden, rapid pressure drop causing condensation of the reagent vapor into droplets where a relative flux can be determined by a measuring device, such as an optical particle counter, examining the condensate.

Figure 1:
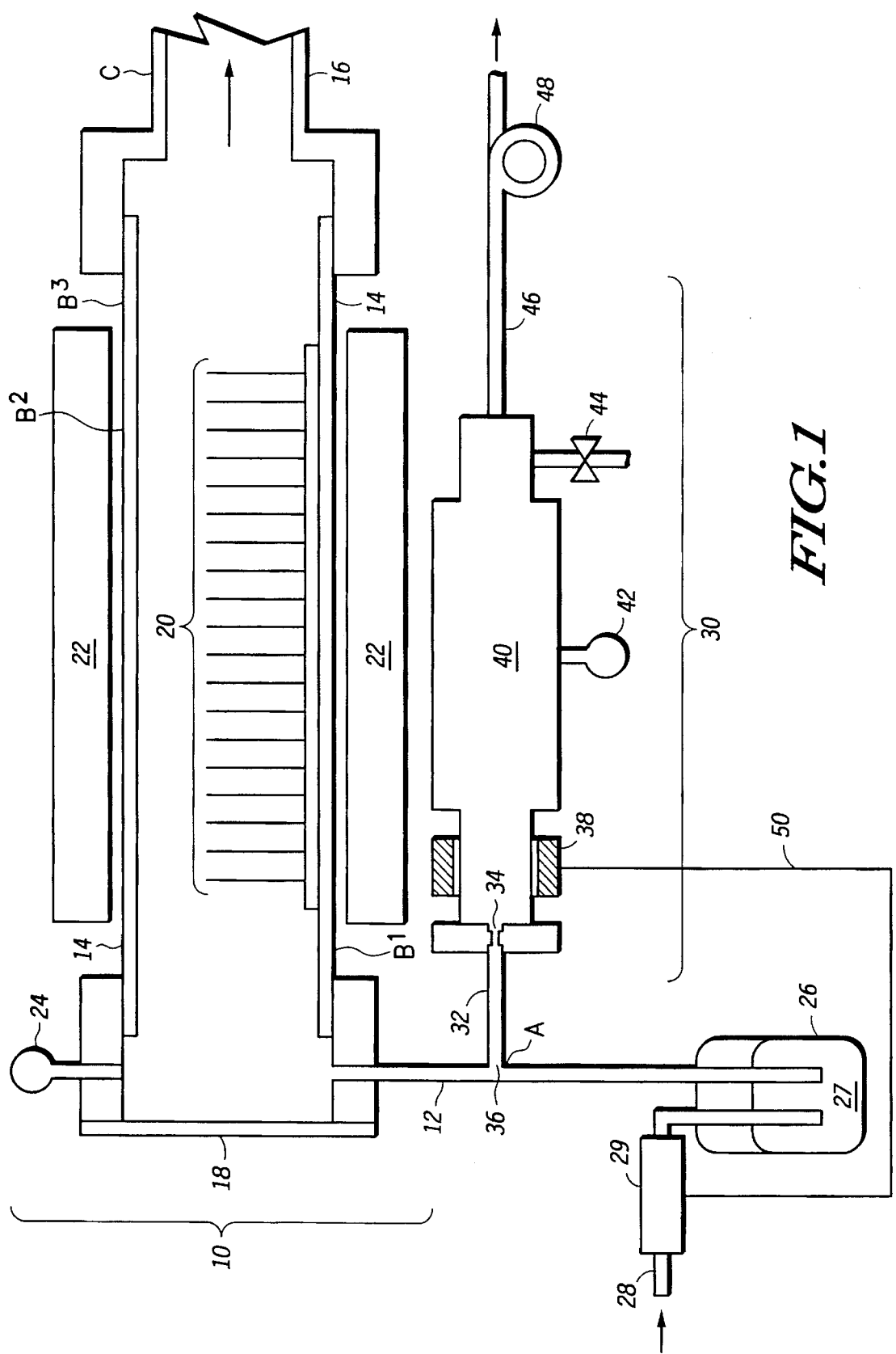
FIG. 1 is a schematic, cross-section of a low pressure chemical vapor deposition (LPCVD) reactor with a vapor flux monitor of this invention on the delivery line to the reactor, where the mechanism for obtaining a sample from the delivery line is an orifice.

The invention will be more completely illustrated in a non-limiting way by reference to FIG. 1, which depicts schematically in cross-section, a system that is an LPCVD reactor 10, which, in turn, has a delivery line 12, a reactor chamber 14 and an exhaust line 16 in communication with one another so that a gas stream may flow through them, in that order. It will be appreciated that the vapor flux monitor of the present invention is not limited to use in conjunction with LPCVD reactors or even CVD reactors, but may be used in monitoring vapor flux in any desired system component. The reactor 10 has a load door 18 through which semiconductor wafers 20, or other suitable work pieces, may be placed into reactor chamber 14. Reactor chamber 14 may be equipped with a furnace 22, as needed, which may be divided into various zones (not shown) as is well known in the art of LPCVD reactors. LPCVD reactor 10 may also be provided with one or more pressure sensor 24, which may be any conventional sensor, such as a baratron. A mixture of reagent gas and carrier gas is provided to delivery line 12 via bubbler 26 which contains the chemical reagent 27 to be transported to the reactor, through which is channeled carrier gas via carrier gas inlet 28. Bubbler 26 has a bubbler heater 31 regulated by bubbler heater controller 33. The amount of carrier gas passed to the bubbler 26, and hence one way the rate at which the reagent or chemical is delivered to LPCVD reactor 10, is controlled by carrier gas mass flow controller 29. Another way the vapor flux of the chemical is controller is by bubbler heater controller 33 which regulates the temperature of bubbler heater 31. The pressure at which the system is operated, e.g. LPCVD reactor 10, is another means of controlling the vapor flux.

Further shown in FIG. 1 is a vapor flux monitor 30 having a gas line 32 with an aperture 34 and a mechanism for obtaining a sample of a gas stream from the LPCVD reactor 10, which mechanism is embodied in FIG. 1 in orifice 36. Vapor flux monitor 30 also contains a mechanism for determining an amount of chemical in a condensate that occurs after the sample is passed through aperture 34, which mechanism is embodied in the FIG. 1 implementation as an optical particle counter 38. The optical particle counter 38 may be an in situ particle monitor (ISPM). Optical particle counter 38 is further provided with a feedback loop 50 to carrier gas mass flow controller 29 to give instruction to the carrier gas mass flow controller 29 to increase or decrease the flow rate as necessary. Feedback loop 50 may also be connected to the bubbler heater controller 33 to adjust the bubbler temperature, as an alternative or additional way of controlling the vapor flux of the desired chemical to increase or decrease reagent flow to bring the process within specification. Vapor flux monitor 30 also has a vacuum chamber 40, which may have one or more of its own pressure sensors 42, as desired, and a gate valve 44 for controlling the pumping speed of the exhaust pump line 46. The gate valve 44 may be a throttling gate valve. The exhaust pump line 46 is in turn connected to vacuum pump 48 for drawing a sample from the gas stream in delivery line 12 at a relatively lower pressure than the pressure of gas stream in delivery line 12.

In operation, an inert carrier gas, such as nitrogen or other suitable inert gas, is provided through carrier gas inlet 28 into bubbler 26 where the reagent of interest is entrained. Both the carrier gas and the reagent are passed as a gas stream through delivery line 12 to LPCVD reactor 10 to form a layer of the reagent on semiconductor wafers 20 by conventional techniques. The vapor flux monitor 30 is shown taking a sample at point A along delivery line 12, although it will be appreciated that point A may be anywhere along delivery line 12 between bubbler 26 and reaction chamber 14. The sampling point for the vapor flux monitor 30 may also be at any other point in the LPCVD reactor 10, for example, at points $B^1$, $B^2$, $B^3$, and many others in reaction chamber 14 or at any point C in exhaust line 16. It is only necessary that the vacuum pump 48 create relatively lower pressure than that present at the sample point in order to draw in the sample.

In the embodiment shown in FIG. 1, a sample of the gas stream having both a carrier gas and a reagent is obtained via orifice 36 due to the relatively lower pressure provided by a vacuum pump 48 on exhaust line 46. The sample is introduced into gas line 32 and then through aperture 34 such that a pressure drop occurs to condense the reagent chemical from the sample to form a condensate. The amount of condensate is measured by optical particle counter 38 and compared with a predetermined reference measurement to give the specified amount of reagent delivery to LPCVD reactor 10. If necessary, instruction is given by optical particle counter 38 to carrier gas mass flow controller 29 and/or bubbler heater controller 33 via feedback loop 50 to adjust the carrier gas flow rate or bubbler temperature, respectively, and thus the vapor flux of the desired chemical to increase or decrease the flux to bring the process within specification. It is anticipated that the vapor flux monitor 30 will not give readings on an absolute scale to permit comparisons between different components. Rather, the optical particle counter 38 should be calibrated with one or more known vapor fluxes and subsequent readings during production processing compared as relative measurements for comparison and flux adjustment.

EXAMPLE 1

Figure 2:
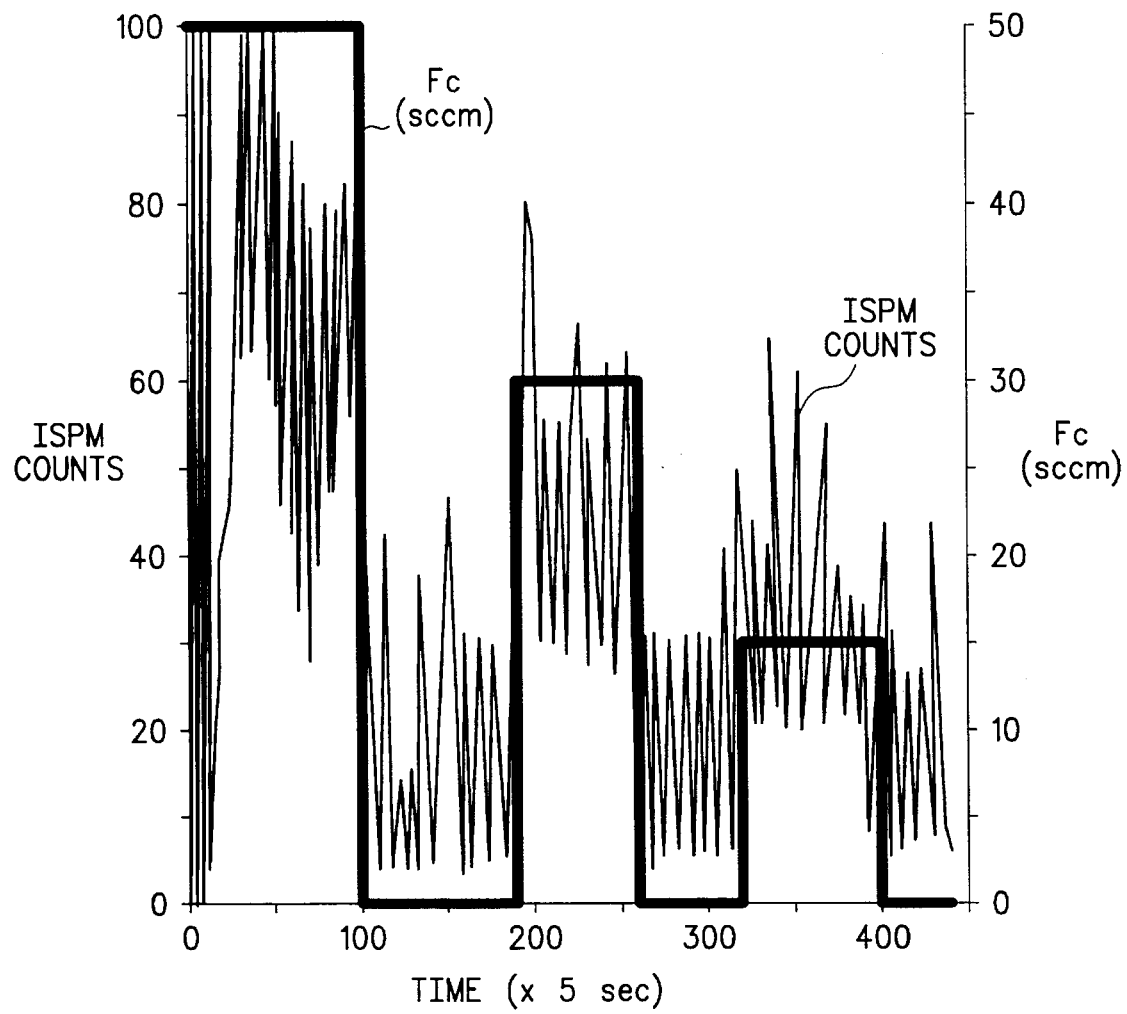
FIG. 2 is a plot of ISPM counts vs. carrier gas flow rate over time through a water bubbler.

An apparatus such as that shown in FIG. 1 was constructed having a delivery line 12, an orifice 36 to a gas line 32 passing to an aperture 34 after which was positioned an ISPM as the optical particle counter 38. To demonstrate the method, water vapor in air as the carrier gas was used to produce the gas stream. The gas stream was sampled from the delivery line via an orifice and introduced via the gas line to the small aperture having a diameter of 1/32" (0.8 mm). The flow on the ISPM side of the aperture was pumped to a low pressure of <5 torr by a mechanical pump (pump 48). The sudden, rapid pressure drop through the aperture causes condensation of the reagent vapor (water, in this Example) into droplets, where a relative flux is determined by the ISPM system. FIG. 2 shows the response of the ISPM to varying water vapor flows through the monitor.

Figure 3:
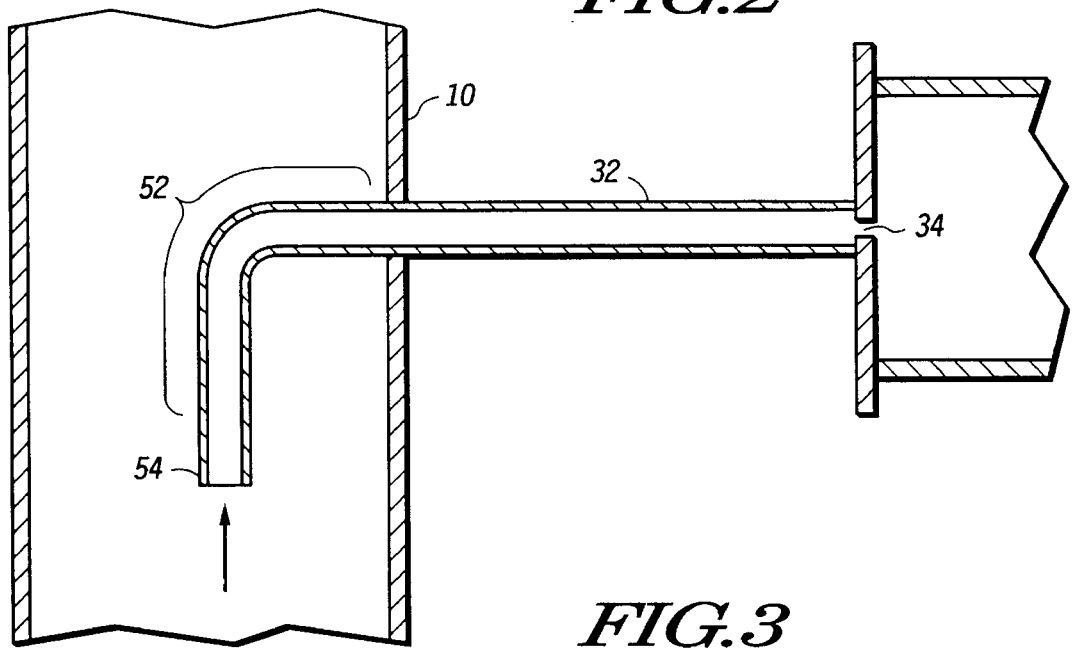
FIG. 3 is a schematic, cross-section of an alternate mechanism for obtaining a sample from a system component, which mechanism involves a probe.

Shown in FIG. 3 is an alternate mechanism for obtaining a sample of a gas stream in a system, such as an LPCVD reactor 10 and introducing the sample into gas line 32 and through aperture 34 by means of probe 52. The end 54 of probe 52 may be tapered, if desired. Probe 52 would be designed to extend into the LPCVD reactor 10 (i.e. a part thereof such as delivery line 12, reactor chamber 14 or exhaust line 16) to take a sample from a more central portion thereof, rather than from a wall via orifice 36. It is not required that probe end 54 face the direction of gas flow; it may be oriented differently. Another term for probe 52 is "sniffer tube."

The foregoing description and illustrations contained herein demonstrate many of the advantages associated with the present invention. The vapor flux monitor may be used with various different chemical reagents, but will have to be calibrated for each species. However, this individualized calibration is also an advantage, for the vapor flux monitor can be "tuned" by proper selection of the aperture diameter and the vacuum used to produce the sample for a particular chemical reagent. Any suitable combination of aperture diameter and vacuum which produces a rapid pressure drop to cause condensation would be acceptable. Without being limited to any particular dimension, in one embodiment of the invention, useful diameters of apertures may equal to or less than 4/32" (3.2 mm). It will be further appreciated that the term aperture as used herein encompasses the possibility of a plurality of apertures that would give the desired condensation. Also, a number of apertures larger than 4/32" (3.2 mm) in series with one another, nozzle-type configurations, and other suitable designs to achieve the desired results are anticipated. The vapor flux monitor further has the advantage of accurately sampling the vapor flux of a particular chemical species in situ, without adversely disrupting the delivery of the reagent. In particular, it has been revealed that the vapor flux monitor of the present invention may be used with systems that use relatively higher flow rates of reagents and higher pumping speeds. The reagents monitored may have relatively lower volatility and relatively steeper vapor pressure curves compared with reagents monitored by previous systems.

Thus it is apparent that there has been provided, in accordance with the invention, a vapor flux monitor that meets most if not all of the needs and advantages set forth previously. Although the invention has been described and illustrated with reference to specific embodiments thereof, it is not intended that the invention be limited to these illustrative embodiments. Those skilled in the art will recognize that modifications and variations can be made without departing from the spirit of the invention. For example, the vapor flux monitor may be used on many other systems besides LPCVD reactors, and may be used to monitor practically any suitable point thereof. In addition, the invention is not limited to low volatility reagents. It is also important to note that the present invention is not limited in any way to the particular implementation or shapes shown in the FIGS. and described in the text. Particularly, the mechanism for obtaining a gas sample is not limited to the orifice and probe embodiments shown and described in the FIGS. and description, respectively. Furthermore, the size of the aperture is not limited to any particular diameter or shape as long as the purposes of this invention are accomplished. Therefore, it is intended that this invention encompasses all such variations and modifications falling within the scope of the appended claims.

What is claimed is:

1. An apparatus for chemical vapor deposition comprising:
   a reaction chamber;
   a gas line capable of including a carrier gas and a low volatility material, wherein the gas line is connected to the reaction chamber and the gas line includes a first aperture;
   a vapor monitor including an inlet, a second aperture, a particle monitor, a vacuum chamber, and an exhaust line, wherein:
      the inlet is connected to the first aperture;
      the second aperture lies between the inlet and the vacuum chamber and has a smaller cross-sectional area compared to the inlet and the vacuum chamber;
      the particle monitor is attached to the vacuum chamber and lies near the second aperture; and
      the exhaust line is connected to the vacuum chamber but not the reaction chamber;
   evacuating means connected to the exhaust line of the vapor monitor; and
   means for adjusting a flow rate of the low volatility material in the gas line, wherein the means for adjusting is coupled to the particle monitor.

2. The apparatus according to claim 1, wherein the second aperture has a diameter no larger than 1/8 inch.

3. The apparatus according to claim 1, wherein the evacuating means includes a vacuum pump.

4. The apparatus according to claim 1, wherein the means for adjusting includes a bubbler heater controller or a mass flow controller.

5. The apparatus according to claim 1, wherein means for adjusting includes a bubbler heater controller and a mass flow controller.

6. An apparatus for chemical vapor deposition comprising:
   a reaction chamber having a first aperture;
   a gas line capable of including a carrier gas and a low volatility material, wherein the gas line is connected to the reaction chamber;
   a vapor monitor including an inlet, a second aperture, a particle monitor, a vacuum chamber, and an exhaust line, wherein:
      the inlet is connected to the first aperture;
      the second aperture lies between the inlet and the vacuum chamber and has a smaller cross-sectional area compared to the inlet and the vacuum chamber;
      the particle monitor is attached to the vacuum chamber and lies near the second aperture; and
      the exhaust line is connected to the vacuum chamber but not the reaction chamber;
   evacuating means connected to the exhaust line of the vapor monitor; and
   means for adjusting a flow rate of the low volatility material in the gas line, wherein the means for adjusting is coupled to the particle monitor.

7. The apparatus according to claim 6, wherein the evacuating means includes a vacuum pump.

8. The apparatus according to claim 6, wherein the second aperture has a diameter no larger than 1/8 inch.

9. The apparatus according to claim 6, wherein the means for adjusting includes a bubbler heater controller or a mass flow controller.

10. The apparatus according to claim 6, wherein means for adjusting includes a bubbler heater controller and a mass flow controller.

11. The apparatus according to claim 6, wherein the vapor monitor further comprises a probe extending through the first aperture.

12. A method of chemical vapor deposition comprising the steps of:
   placing a substrate within a reaction chamber;
   flowing a gas through a gas line, wherein the gas includes a carrier gas and a low volatility material;
   flowing a first portion of the gas into the reaction chamber while the substrate is within the reaction chamber;
   flowing a second portion of the gas through a first aperture of the gas line into a vapor monitor having a second aperture, a vacuum chamber, a particle monitor, and an exhaust line;
   flowing the second portion of the gas through the second aperture to the vacuum chamber to condense a portion of low volatility material from the second portion of the gas;
   monitoring the particle monitor to determine how much low volatility material is flowing within the first portion of the gas line; and
   removing the second portion of the gas line from the vapor monitor by evacuating the exhaust line without flowing any of the second portion of the gas into the reaction chamber.

13. The method according to claim 12, wherein the step of flowing the second portion of the gas through the second aperture is performed such that the second aperture has a diameter no larger than 1/8 inch.

14. The method according to claim 12, wherein the step of flowing the second portion of the gas through the second aperture is performed while the vacuum chamber is at a pressure less than 5 torr.

15. The method according to claim 12, further comprising a step of adjusting a bubbler heater using a feedback loop coupled to the particle monitor.

16. The method according to claim 12, further comprising a step of adjusting a mass flow controller of the carrier gas using a feedback loop coupled to the particle monitor.

17. The method according to claim 12, wherein the low volatility material is an organo-metallic chemical.

18. The method according to claim 12, further comprising a step of adjusting a bubbler heater and a mass flow controller of the carrier gas using a feedback loop coupled to the particle monitor.

19. A method of chemical vapor deposition comprising the steps of:

placing a substrate within a reaction chamber;

flowing a gas into the reaction chamber while the substrate is within the reaction chamber, wherein the gas includes a carrier gas and a low volatility material;

flowing a first portion of the gas into a first exhaust line connected to the reaction chamber;

flowing a second portion of the gas through a first aperture of the reaction chamber into a vapor monitor having a second aperture, a vacuum chamber, a particle monitor, and a second exhaust line;

flowing the second portion of the gas through the second aperture to the vacuum chamber to condense a portion of low volatility material from the second portion of the gas;

monitoring the particle monitor to determine how much low volatility material is flowing within at least a portion of the reactor; and removing the second portion of the gas from the vapor monitor by evacuating the second exhaust line without flowing any of the second portion of the gas into the reaction chamber.

20. The method according to claim 19, wherein the step of flowing the second portion of the gas through the second aperture is performed such that the second aperture has a diameter no larger than 1/8 inch.

21. The method according to claim 19, wherein the step of flowing the second portion of the gas through the second aperture is performed while the vacuum chamber is at a pressure less than 5 torr.

22. The method according to claim 19, further comprising a step of adjusting a bubbler heater using a feedback loop coupled to the particle monitor.

23. The method according to claim 19, further comprising a step of adjusting a mass flow controller of the carrier gas using a feedback loop coupled to the particle monitor.

24. The method according to claim 19, further comprising a step of adjusting a bubbler heater and a mass flow controller of the carrier gas using a feedback loop coupled to the particle monitor.

25. The method according to claim 19, wherein the low volatility material is an organo-metallic chemical.

26. The method according to claim 19, wherein the step of flowing a second portion of the gas through the first aperture includes flowing the second portion of the gas through a probe that extends through the first aperture.

* * * * *